Patented Jan. 30, 1940

2,188,765

UNITED STATES PATENT OFFICE 2,188,765

METHOD OF HEAT TREATING BRASS SHIMS AND SHIM STOCK

Earle L. Young, Awosting, N. J., assignor to Laminated Shim Co., Inc., Long Island City, N. Y., a corporation of New York No Drawing. Application May 31, 1938, Serial No. 210,939

2 Claims. (Cl. 148—4)

This invention relates to the heat treatment of thin brass material used particularly as shim stock for the manufacture of bearing shims so as to prevent loss of compression strength when thin brass laminations are manufactured into shims of the type known as laminated shims.

Laminated shims as now produced usually consist of a plurality of thin brass strips having the approximate composition of 65% copper and 35% zinc and of the approximate thickness of .002 to .003 of an inch, with or without a base plate, which are secured together into a pack or strip by a solder bond between the laminations, as described, for example, in the Lindhe Patent No. 969,709, granted September 6, 1910.

In the manufacture of laminated shims of this type or laminated shim stock from which such shims are produced, it is necessary to coat each side of the thin strip of brass of the approximate thickness of .002 to .003 of an inch with solder which is subsequently used to form the bond between the layers or laminations of the shim and to heat and press the laminations together, as described in the Lindhe Patents No. 1,184,654, granted May 23, 1916, and No. 1,096,512, granted May 12, 1914. In this solder coating it is the customary practice to dip the thin laminations forming the shim, or the thin strips of brass from which the shim stock is formed, into a solder bath maintained at a temperature of approximately 600 to 650° F. to coat the laminations or the strips from which the shim stock is manufactured with a layer of solder, so that the laminations can be bonded together, and to later heat these laminations to a temperature sufficient to fuse this solder coating and press the laminations together to form the integrally bonded laminated shim stock or shim pack. In this coating or dipping operation, the thin strip of brass or the thin laminations from which the shims are manufactured quickly reach the temperature of the solder bath itself and become heated throughout to such an extent that the compression strength of the thin brass strips is considerably reduced in this solder coating operation, and if in the reheating or sweating together operation the laminations are heated only to a temperature sufficient to refuse or remelt the solder coating this low or reduced compression strength is carried into the finished shim or shim stock and produces a shim of a compression strength below that of ordinary cold rolled brass.

As these laminated shims are normally used as spacers between the halves of split bearings, they must be able to withstand the compression strain placed upon them in tightening up the bearings and if the material of the shim is too soft or has too low compression strength, it may be squeezed out of the bearing either under the pressure to which the bearing is tightened or under the compression strains which it encounters in the operation of the bearing.

The object of my invention is therefore to provide a method of heat treating these thin laminations or thin strips of approximately .002 to .003 of an inch in thickness after the solder coating operation to restore the compression strength to approximately that possessed by the rolled brass strips before they have been heated in the solder coating and sweating operations. I have discovered that if these thin strips of shim material, or the thin laminations of the shims themselves, are heated for approximately five minutes at a temperature of around 1200° F., the compression strength of the strips, which has dropped down materially in the solder coating operation, may be restored to substantially the strength which the material had prior to the solder coating operation.

A metallographic examination of the materials used in the manufacture of laminated shims shows that the strip brass, from which the laminations are produced, as it comes from the rolling mill appears to be thoroughly annealed with crystals of small size and no evidence of cold working. When, however, this same material is examined metallographically after it has been subjected to the solder coating operation, the size of the crystals is larger than in the original material, and on compression tests the material yields at a lower pressure than the strips of brass before the solder coating operation. After the reheating or heat treatment at 1200° F., the grain size appears to be restored to approximately that existing in the rolled stock before the solder coating operation.

In the following examples the samples to produce test specimens were stacked to approximately one inch in height with the same number of strips in each stack and the tests were made in a standard compression machine of 200,000 pounds capacity, using a ball and socket leveling block to equalize the load. Deflection (compression) was measured with a micrometer gauge. The rate of travel of the moving head of the machine was approximately .01 of an inch per minute.

The original thin brass sheets of a thickness of .002 of an inch when stacked to a height of .99 of an inch showed a yield point of 48,000 pounds per square inch; whereas, the same material, after having been subjected to the heat of the solder coating operation, showed a reduction in compression strength to 32,000 pounds per square inch.

On material .003 of an inch in thickness, the yield point, in pounds per square inch before being subjected to the heat of the solder coating operation was 50,000 pounds per square inch, and after being subjected to the heat of the solder coating operation, this compression strength had been reduced to 33,000 pounds per square inch.

When the material of .002 of an inch in thickness which had been subjected to the heat of the solder coating operation was heated for five minutes to 1200° F. and permitted to cool in air, it showed a restoration in compression strength in one sample of 44,000 pounds per square inch, in another sample of 46,000 pounds per square inch and in another sample of 42,000 pounds per square inch.

The material was of slightly lower compression strength than the original material from which the shim laminations were produced but substantially higher in compression strength than the material immediately after the solder coating operation and before the subsequent heat treatment.

Likewise, with the material .003 of an inch in thickness which after the heat of the solder coating operation had a compression strength of only 33,000 pounds per square inch, when three samples of this material were heated to 1200° F. for a period of five minutes and then permitted to cool in air, the compression strength of material of all three samples was restored, in one instance, to 53,000 pounds per square inch, and, in two instances, to 47,000 pounds per square inch. This material of .003 of an inch when produced as laminated shims, after the heat treatment at 1200° F. for five minutes, showed a compression yield point of 56,000 pounds per square inch as compared with a yield point of untreated solid brass of ⅛ inch in thickness of 45,000 pounds per square inch showing a greater ability to withstand compression after this heat treatment than normal solid brass from which unlaminated shims are sometimes produced.

The reheating to approximately 1200° F. for approximately five minutes to restore the solder coated brass to its normal grain structure and compression strength can be carried out in connection with the fusing and pressing together of the solder coated brass sheets, or the reheating can be carried out as a separate heat treating step, preferably, however, before the sweating or pressing together of the separated sheets or laminae constituting the shim.

While I have found that reheating to approximately 1200° F. for approximately five minutes or until the shim stock reaches a substantially uniform temperature throughout and cooling in air restores the compression strength of the material as indicated above, it will be understood that reasonable variations from this exact procedure given by way of example such as heating to approximately 1100° F. to 1300° F. for four to six minutes, are within the scope of my invention.

I claim:

1. The method of restoring the compression strength of thin brass material of the approximate thickness of .002 to .003 of an inch used in the manufacture of solder bonded laminated shims, which comprises heating the thin material after the solder coating operation in which the thin material is dipped in a solder bath maintained at a temperature of 600 to 650° F. to a temperature of approximately 1200° F. for long enough to permit the material to reach substantially the same temperature throughout and then pressing the thin sheets together and cooling in atmosphere to room temperature.

2. The method of treating solder-bonded laminated shims to restore the compression strength, which comprises solder coating thin brass sheets of the approximate thickness of .002 to .003 of an inch, at temperatures of approximately 600 to 650° F., which reduces the compression strength of the material, and subsequently reheating the said shim material to a temperature of approximately 1100 to 1300° F. for from 4 to 6 minutes, and then pressing the thin sheets together and cooling to room temperature.

EARLE L. YOUNG.